(12) United States Patent
Tsuduki

(10) Patent No.: US 8,780,394 B2
(45) Date of Patent: Jul. 15, 2014

(54) IMAGE FORMING APPARATUS AND METHOD OF DISCHARGING SHEET IN THE SAME

(75) Inventor: Seiji Tsuduki, Saitama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/412,440

(22) Filed: Mar. 5, 2012

(65) Prior Publication Data

US 2012/0236340 A1 Sep. 20, 2012

Related U.S. Application Data

(60) Provisional application No. 61/453,519, filed on Mar. 16, 2011.

(51) Int. Cl.
*G06F 15/00* (2006.01)

(52) U.S. Cl.
USPC .......................................................... 358/1.15

(58) Field of Classification Search
USPC ........................................................ 358/1.12
See application file for complete search history.

(56) References Cited

U.S. PATENT DOCUMENTS

2008/0316541 A1* 12/2008 Takata et al. .................. 358/401

FOREIGN PATENT DOCUMENTS

JP 2004-198475 7/2004

* cited by examiner

*Primary Examiner* — Saeid Ebrahimi Dehkordy
(74) *Attorney, Agent, or Firm* — Patterson & Sheridan, LLP

(57) ABSTRACT

Certain embodiments provide an image forming apparatus including: a main body configured to include a front surface and a rear surface; a printing section provided in the main body and configured to form an image on a sheet according to image data and print-output the sheet; an operation panel configured to include a panel surface for giving an operation input to the printing section; a moving mechanism configured to allow the operation panel to move with respect to the main body; and a rotating mechanism configured to rotate the operation panel about a vertical axis over an angle range including a first angle at which the panel surface faces the front direction and a second angle at which the panel surface faces the rear direction.

19 Claims, 8 Drawing Sheets

IMAGE FORMING APPARATUS AND METHOD OF DISCHARGING SHEET IN THE SAME

CROSS-REFERENCE TO RELATED APPLICATION

The present application claims priority under 35 U.S.C. 119 to U.S. Provisional Application Ser. No. 61/453,519, to Tsuduki, filed on Mar. 16, 2011, the entire disclosure of which is incorporated herein by reference.

FIELD

Embodiments described herein relate generally to an image forming apparatus and a method of discharging a sheet in the image forming apparatus.

BACKGROUND

An image forming apparatus includes a base on a main body, a joint at a distal end of the base, an arm fixed to the joint, and a panel surface at a distal end of the arm. The image forming apparatus holds the panel surface on the arm using a tilt mechanism. An operation panel is allowed to move in a certain degree of a range by the joint and the tilt mechanism.

Further, an image forming apparatus with a finisher includes paper discharge destinations on both the left and right sides. The image forming apparatus discharges a sheet onto a tray on the right side and discharges a sheet onto a tray on the upper side of the finisher on the left side.

The paper discharge destination for a print by the image forming apparatus is selected by a user input to the operation panel. An attribute of a sheet, designation of a side of a sheet to be discharged, and the like are switched and input to the operation panel.

However, a moving range of the operation panel is limited. A position of panel operation and a position where a sheet is discharged are far apart from each other. Operability of the operation panel by the user is not high. This is inconvenient for the user.

DETAILED DESCRIPTION

Figure 1:
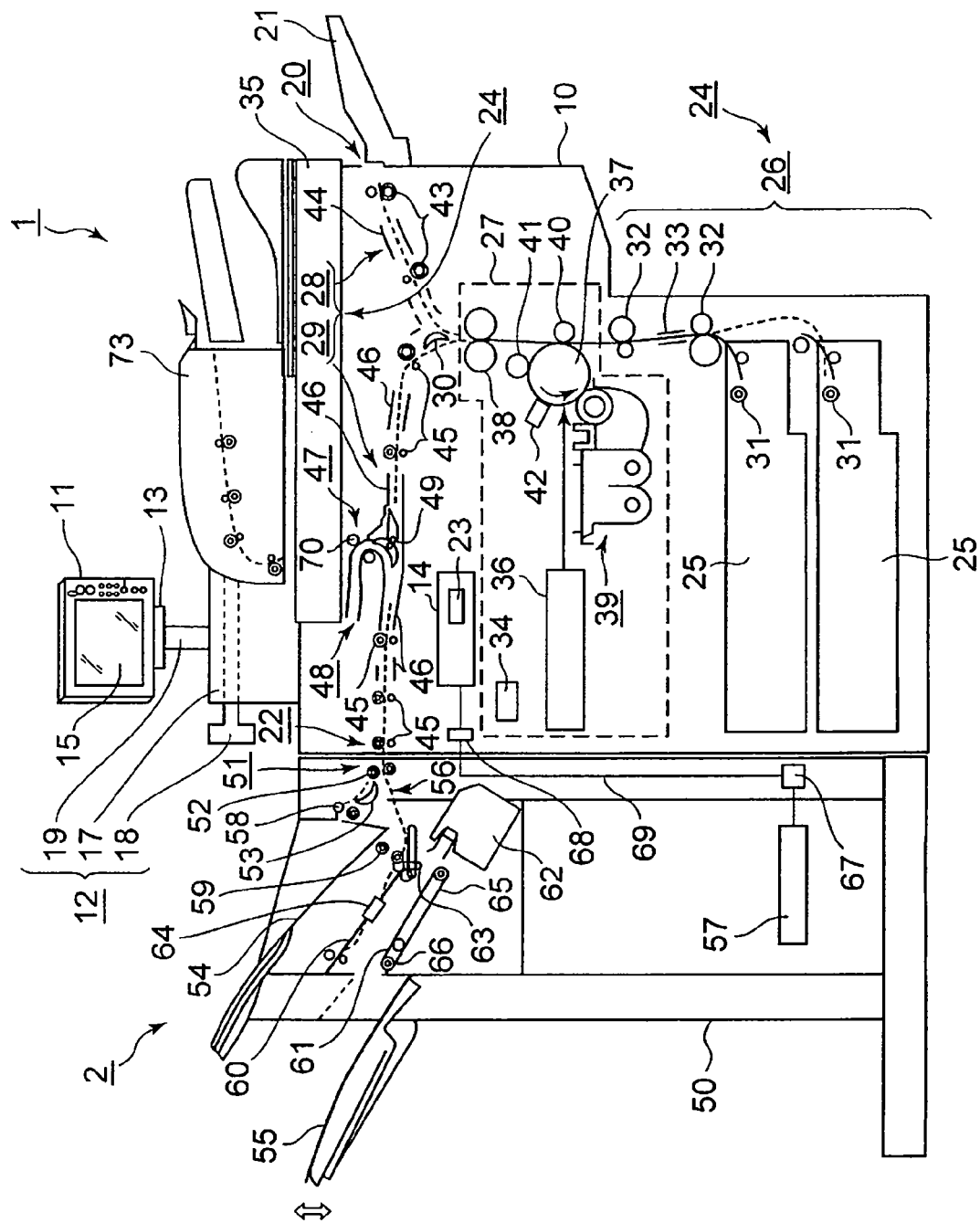
FIG. 1 is a configuration diagram of an image forming apparatus according to a first embodiment.

Certain embodiments provide an image forming apparatus including: a main body configured to include a front surface and a rear surface; a printing section provided in the main body and configured to form an image on a sheet according to image data and print-output the sheet; an operation panel configured to include a panel surface for giving an operation input to the printing section; a moving mechanism configured to allow the operation panel to move with respect to the main body; and a rotating mechanism configured to rotate the operation panel about a vertical axis over an angle range including a first angle at which the panel surface faces the front direction and a second angle at which the panel surface faces the rear direction.

An image forming apparatus and a method of discharging a sheet in the image forming apparatus are explained in detail below with reference to the accompanying drawings as examples. In the figures, the same components are denoted by the same reference numerals and signs and redundant explanation of the components is omitted.

First Embodiment

Figure 2A:
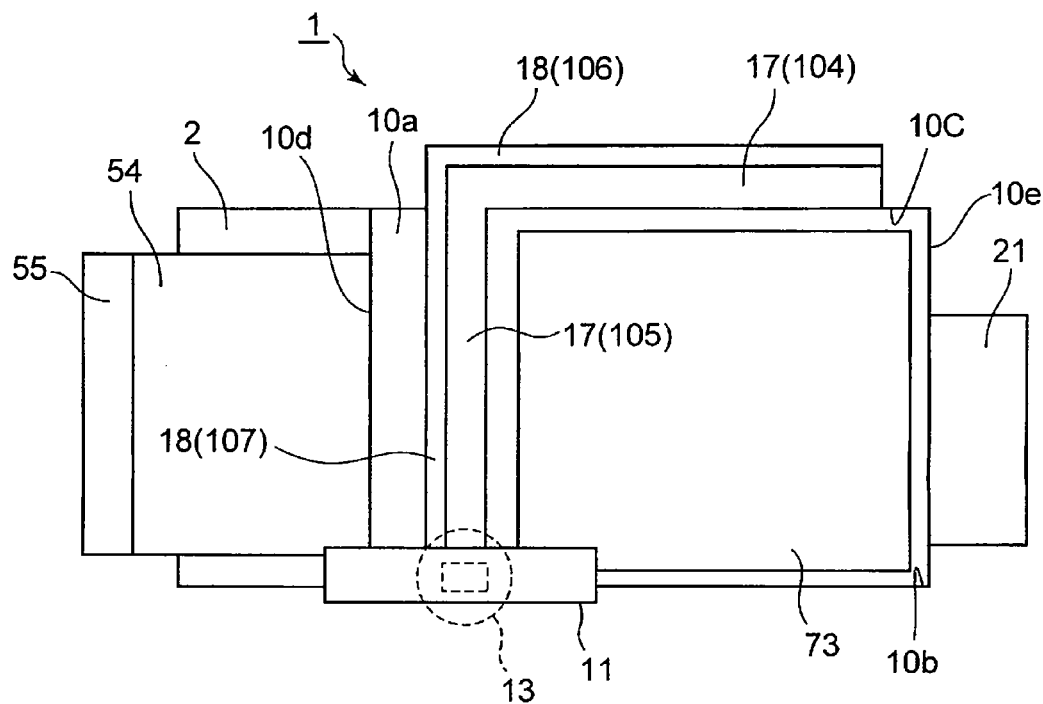
FIG. 2A is a top view of the image forming apparatus.
Figure 2B:
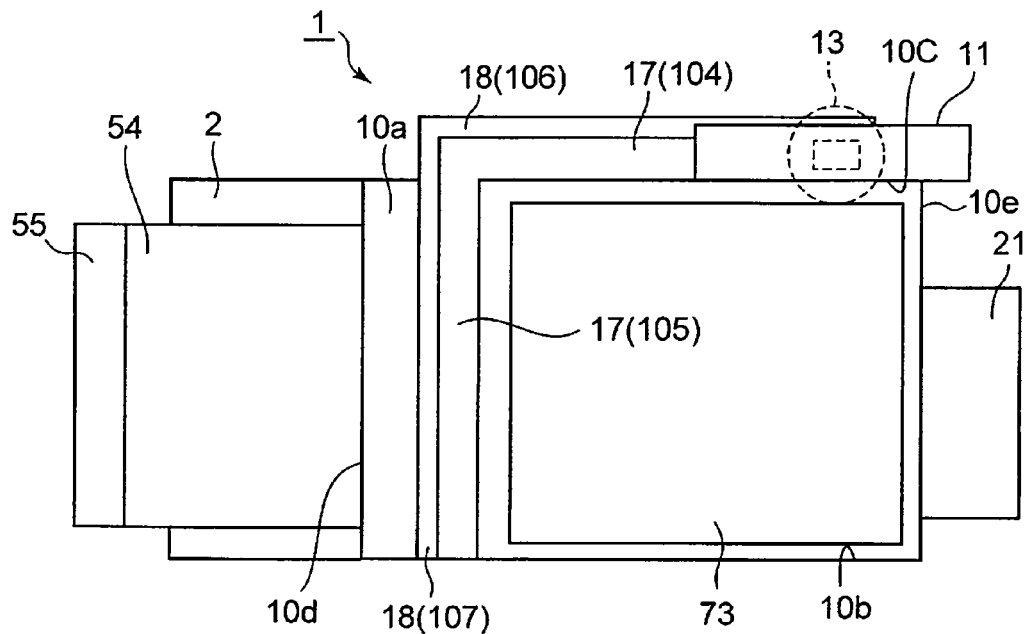
FIG. 2B is another top view of the image forming apparatus.

FIG. 1 is a configuration diagram of an MFP. FIGS. 2A and 2B are top views of the MFP. In the figures, components having the same reference numerals and signs represent the same components.

An MFP 1 is an image forming apparatus according to a first embodiment. The MFP 1 is a monochrome MFP including plural trays. The MFP 1 is coupled to a finisher 2.

The finisher 2 executes finishing on a sheet print-output by the MFP 1. The finishing for the sheet refers to sorting, grouping, or stapling applied to plural sheets.

The MFP 1 includes a main body 10, an operation panel 11 movable on the main body 10 with respect to the main body 10, and a moving mechanism 12 that holds the operation panel 11 to be movable with respect to the main body 10.

The MFP 1 includes a rotating mechanism 13 that rotates the operation panel 11 about a vertical axis, a main controller 14 for overall control, and a printing section 27 that executes an image forming process. The main body 10 includes an upper surface 10a, a front surface 10b, a rear surface 10c, a left side surface 10d, and a right side surface 10e. The left and the right respectively refer to the finisher 2 side and a tray 21 side with respect to the front surface 10b.

The operation panel 11 includes a panel surface 15 operated by a user and a driving circuit 16 for driving the operation panel 11. The operation panel 11 is allowed to reciprocatingly slide horizontally to the front, the rear, the left, and the right.

The panel surface 15 receives a user operation command and input information. The panel surface 15 displays an interactive screen for urging the user to perform operation. The panel surface 15 urges the user to select a paper discharge destination for a sheet.

The driving circuit 16 notifies the main controller 14 of input information data.

The moving mechanism 12 includes a base frame 17 fixed on the main body 10, a rail 18 integrally formed with the base frame 17, and an arm 19 that supports the operation panel 11.

Figure 3:
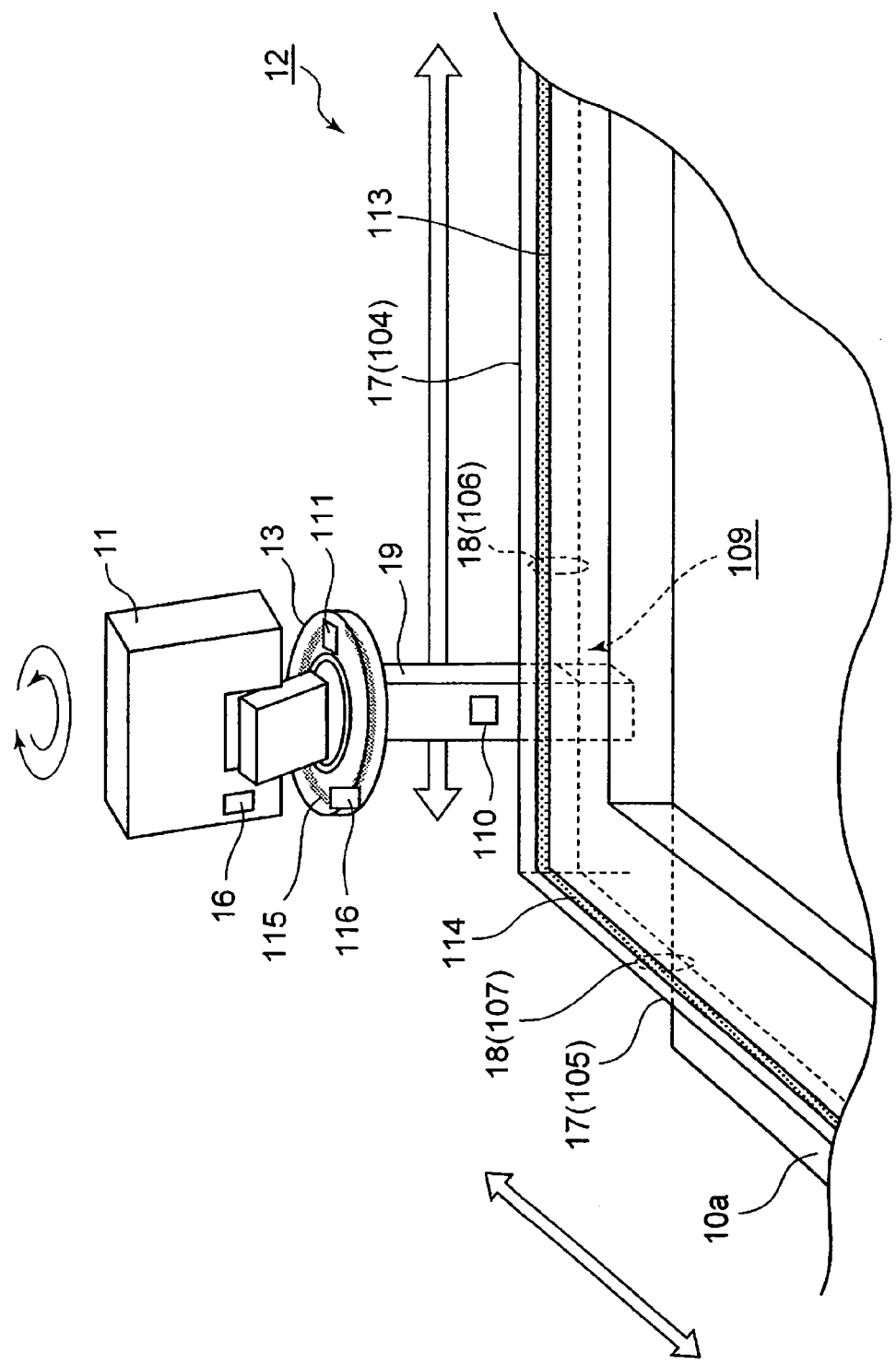
FIG. 3 is a perspective view of an operation panel, a moving mechanism, and a rotating mechanism used in the image forming apparatus.
Figure 4:
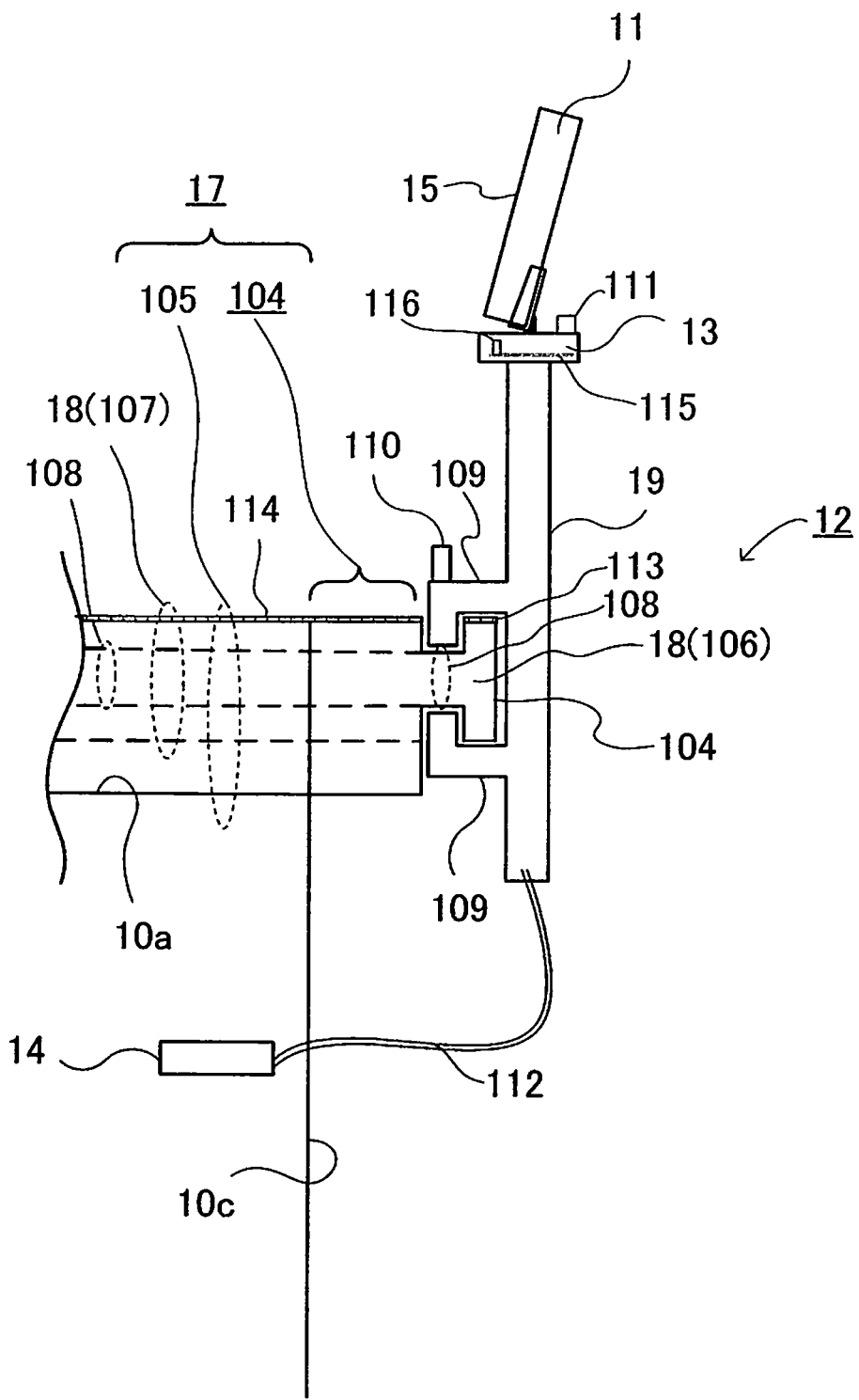
FIG. 4 is a diagram of a side sectional structure of the moving mechanism used in the image forming apparatus.

FIG. 3 is a perspective view of the operation panel 11, the moving mechanism 12, and the rotating mechanism 13. FIG. 4 is a diagram of a side sectional structure of the moving mechanism 12. In FIGS. 3 and 4, a document feeder 73 is not shown. The reference numerals and signs already described above represent the same components.

The base frame 17 includes a frame portion 104 long in the left and the right and a frame portion 105 long in the front and the rear. The frame portions 104 and 105 assume an L shape in top view.

A rear surface of the frame portion 104 is located further outside than the rear surface 10c of the main body 10. A left side surface of the frame portion 105 is located not to extend beyond the left side surface 10d of the main body 10.

The rail 18 includes two rail heads 106 and 107 orthogonal to each other in the rail length direction. The railhead 106 is coupled to the frame portion 104 by a rail neck 108. The rail head 107 is also coupled to the frame portion 105 by the rail neck 108.

The rail head 106 projects from the base frame 17 to the rear side. The rail head 107 projects from the base frame 17 to be closer to the finisher 2. One end of the rail head 106 and one end of the rail head 107 are coupled above the rear on the finisher 2 side of the main body 10.

The arm 19 changes a traveling direction at a right angle in a position where the arm 19 is coupled. The arm 19 smoothly moves in the position where the arm 19 is coupled.

Further, the arm 19 includes a grasping section 109. The grasping section 109 is fit in the rail neck 108 of the rail 18. The grasping section 109 slides while grasping the rail 18 and being in contact with the rail 18.

The arm 19 includes a cable 112 to pass through the inner side of the arm 19. The cable 112 has cable length long enough for fluctuation in a position of the operation panel 11. The cable 112 includes a power supply line and a signal line.

One end of the cable 112 is electrically connected to the driving circuit 16. The other end of the cable 112 is electrically connected to the main controller 14.

The rotating mechanism 13 rotates the panel surface 15 360 degrees. Alternatively, the rotating mechanism 13 rotates the panel surface 15 180 degrees.

As an example, the rotating mechanism 13 includes a pair of a lower disk having a groove therearound and a lower disk having a projection, which is fit in the groove, therearound. The rotating mechanism 13 may use a pair of thrust plates.

The rotating mechanism 13 may further include a member for rotation regulation in the disk pair or the like. The rotating mechanism 13 may include a one-way clutch. The rotating mechanism 13 may use a latchet mechanism.

The user stands closer to the tray 21 on the front side on the floor with respect to the MFP 1 having the configuration explained above.

As shown in FIG. 2A, the operation panel 11 is moved closer to the finisher 2 on the front side by the moving mechanism 12 with a tensile force by the user. The panel surface 15 is faced to the front side by the rotating mechanism 13 with a rotational force generated by the action of the user.

Plural original documents are set in the document feeder 73. The number of copies is input to the operation panel 11. The operation panel 11 detects that a copy start button is pressed.

Figure 5:
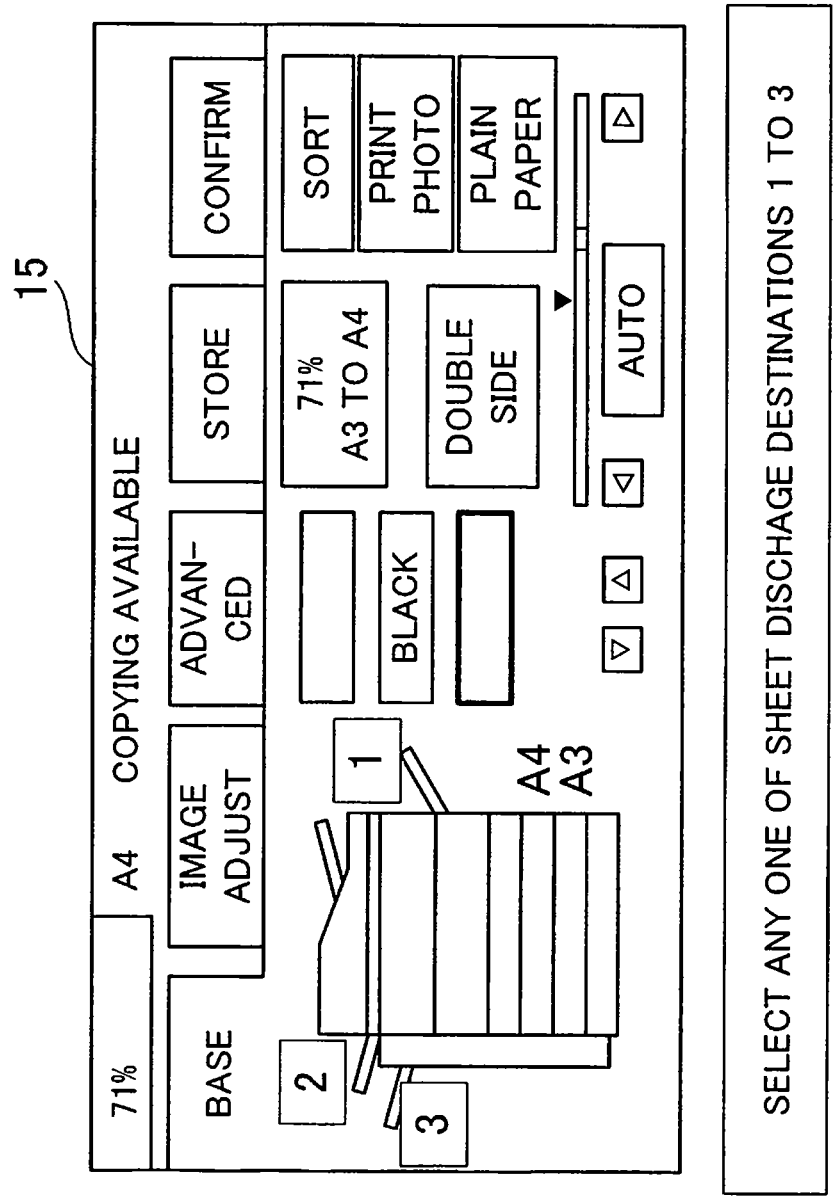
FIG. 5 is a diagram of a display example of the operation panel used in the image forming apparatus.

FIG. 5 is a diagram of a display example by the panel surface 15 of the operation panel 11. The reference numerals and signs already described above denote the same components.

The operation panel 11 displays, for example, icons of '1', '2', and '3', all of which indicate paper discharge destinations. The MFP 1 causes the user to select any one of the three paper discharge destinations. The operation panel 11 may cause the icons to blink.

If the MFP 1 detects, for example, a user input of '1', the MFP 1 determines the right tray 21 as the paper discharge destination. The MFP 1 sends a switching command to a gate 30 and starts a printing job.

The gate 30 (FIG. 1) is a flapper having two rotating positions. The gate 30 closes a sheet path to a third conveying section 29. The gate 30 opens a sheet path to a second conveying section 28. The MFP 1 reads a document surface with a scanner 35 and executes an image forming process.

The gate 30 leads a sheet, which is received from the printing section 27, to the second conveying section 28. The second conveying section 28 discharges the sheet onto the tray 21.

The MFP 1 continues copying until the number of print-output sheets reaches a commanded number of sheets. Thereafter, the MFP 1 ends the printing job.

Subsequently, the user stands closer to the tray 21 on the rear side of the MFP 1. The operation panel 11 located on the front side is moved closer to the rear side by the moving mechanism 12 with a tensile force by the user.

As shown in FIG. 2B, the operation panel 11 moves from a corner on the rear side closer to the finisher 2 to the rear side closer to the tray 21 along the rail 18. The panel surface 15 facing the front side turns to the rear side with a rotating force by the user.

On the tray 21 side on the rear side, the user commands printing on the operation panel 11. The MFP 1 detects from the operation panel 11 that the tray 21 is selected as the paper discharge destination.

If the MFP 1 detects a copy start command, the MFP 1 sends a command for opening a sheet path to the second conveying section 28 to the gate 30 and print-outputs the sheet. The MFP 1 discharges all sheets onto the tray 21.

An example in which the user stands closer to the tray 21 on the rear side or closer to the finisher 2 on the front side of the MFP 1 and takes a copy is substantially the same as the example explained above.

As explained above, the user applies a force to the MFP 1, whereby the operation panel 11 moves to the front, rear, left, and right and the panel surface 15 faces the user.

The MFP 1 discharges all sheets to a selected paper discharge destination according to a printing command input by the user in a position closer to the tray 21 on the rear side or closer to the finisher 2 on the front side.

In the related art, the operation panel is fixed. In the MFP 1, the operation panel 11 can move to the front, rear, left, and right. The MFP 1 receives the number of copies, detection of a printing command, selection of a paper discharge destination, and the like according to a position where the user stands.

Irrespective of whether the user stands on the left or right or the front or rear of the MFP 1, the moving mechanism 12 can move the operation panel 11 to the front, rear, left, and right.

Irrespective of whether the front or the back of the panel surface 15 faces the user, the user can operate the operation panel 11 from both the rear side and the front side of the MFP 1.

The moving mechanism 12 allows the operation panel 11 to execute interactive operation with the user in a position desired by the user.

The movement of the operation panel 11 by the moving mechanism 12 is independent in the front rear direction and the left right direction. The rotating mechanism 13 can rotate the operation panel 11, which is moving in the front rear direction, 360 degrees. The rotating mechanism 13 can rotate the operation panel 11, which is moving in the left right direction, 360 degrees.

Second Embodiment

In the first embodiment, the user manually moves the operation panel 11 and directly designates a paper discharge destination on the operation panel 11.

In a second embodiment, as in the first embodiment, the user manually moves the operation panel 11. An image forming apparatus according to the second embodiment detects in which position the operation panel 11 is currently located, automatically selects a paper discharge destination according to the position, and discharges a sheet.

Specifically, the image forming apparatus according to this embodiment detects in which position the user is operating the panel surface 15, automatically selects a paper discharge destination in a place closest to the position of the user, and discharges a print to the paper discharge destination.

When mode for using finishing by a finisher is selected, the image forming apparatus discharges a print to the finisher.

The image forming apparatus according to this embodiment is also the MFP 1. The MFP 1 includes a function of detecting a position of the operation panel 11 and a function of detecting a direction that the panel surface 15 faces.

The position of the operation panel 11 refers to a slide position of the panel surface 15 in a horizontal plane with respect to the main body 10. The direction of the panel surface 15 refers to a rotation angle of the panel surface 15 with respect to a reference angle. In the horizontal plane, the direction refers to an orientation.

Otherwise, the MFP 1 has substantially the same configuration as the example explained above unless specifically noted.

The main controller 14 includes a function of detecting the position of the operation panel 11 on the rail 18 and the direction that the panel surface 15 faces. The main controller 14 includes a function of controlling a printing job.

A method of detecting the position and the direction by the main controller 14 is explained below.

As shown in FIGS. 3 and 4, the MFP 1 includes a first detecting section 110 that detects the slide position of the panel surface 15 and a second detecting section 111 that detects the rotation angle of the panel surface 15.

As an example concerning the detection of the slide position by the first detecting section 110, the railhead 106 includes a resistor 113 in a contact portion of the rail head 106 and the arm 19. The rail head 107 includes another resistor 114 in a contact portion of the rail head 107 and the arm 19.

A resistance value of the resistor 113 and a resistance value of the resistor 114 are different from each other. The resistance values of the resistors 113 and 114 are uniform in the rail length direction.

As an example concerning the detection of the rotation angle of the panel surface 15 by the second detecting section 111, the rotating mechanism 13 includes a resistor 115 on the lower disk and a brush 116 having conductivity on the upper disk. The resistor 115 is an annular belt. The belt includes partial cutouts. The resistor 115 assumes a C shape in a top view.

The main controller 14 includes a function of selecting a paper discharge destination for a sheet.

Referring back to FIG. 1, the MFP 1 includes a paper discharge port 20 on the right side of the main body 10, the tray (a first tray) 21 connected to the paper discharge port 20, and a paper discharge port 22 on the left side of the main body 10.

The finisher 2 includes a tray (a second tray) 54 in an upper part of a main body 50 and a tray (a third tray) 55 on the left side of the main body 50.

The tray 21 of the MFP 1 is a first paper discharge destination for a sheet. The tray 54 of the finisher 2 is a second paper discharge destination for a sheet. The tray 55 of the finisher 2 is a third paper discharge destination for a sheet.

The main controller 14 includes a selection control section 23. The selection control section 23 detects the position of the user with respect to the main body 10. The main controller 14 causes an MFP side conveying mechanism 24 to discharge a sheet from any one of the paper discharge port 20 and the paper discharge port 22 present in a place closest to the detected position.

The operation panel 11 detects selection of a finish mode. The main controller 14 causes the MFP side conveying mechanism 24 to convey a sheet to the finisher 2.

Specifically, the selection control section 23 includes a function of selecting any one of the tray 21, the tray 54 on the finisher 2 side for outputting a sheet without finishing, and the tray 55 on the finisher 2 side for outputting a sheet with finishing.

The function of the selection control section 23 is executed by a CPU (central processing unit), a ROM (read only memory), and a RAM (random access memory).

The MFP 1 includes two paper feeding sections 25, a first conveying section 26 that pulls a sheet from the paper feeding sections 25 upward in the main body 10, and the printing section 27 that print-outputs the sheet on which an image is formed according to image data.

The MFP 1 includes the second and third conveying sections 28 and 29 that convey the sheet from the printing section 27 and the gate 30 that switches a sheet conveying path to any one of the second conveying section 28 and the third conveying section 29.

The first conveying section 26 includes rollers 31 that pick up sheets set in the paper feeding sections 25, plural pairs of rollers 32 that respectively feed the sheets to the printing section 27, a sheet guide 33, and a motor.

The sheet guide 33 and nips of the rollers 32 form the sheet conveying path.

The printing section 27 reads image data generated by the scanner 35 from a memory 34. The printing section 27 forms, on a sheet, a toner image not developed yet according to the image data. The printing section 27 fixes the toner image on the sheet and print-outputs the sheet.

The printing section 27 includes a laser exposure device 36 that modulates a laser diode according to image data and a photoconductive drum 37 that forms an electrostatic latent image on a surface thereof using the laser exposure device 36.

The printing section 27 includes a charging device 38 that charges the surface of the photoconductive drum and a developing device 39 that develops the electrostatic latent image on the photoconductive drum 37.

Further, the printing section 27 includes a transfer device 40 that transfers a toner image visualized by the developing device 39 onto the sheet, a charge removing device 41 that removes surface charges of the photoconductive drum 37, and a fixing device 42 that fixes the unfixed image on the sheet.

The second conveying section 28 includes plural pairs of rollers 43 and a sheet guide 44. The second conveying section 28 conveys the sheet to the paper discharge port 20.

The sheet guide 44 and nips of the rollers 43 form the sheet conveying path.

The third conveying section 29 includes plural pairs of rollers 45, a sheet guide 46, and a reversing section 47 that reverses a sheet side. The sheet guide 46 and nips of the rollers 45 form the sheet conveying path.

The third conveying section 29 conveys the sheet to the paper discharge port 22. The third conveying section 29 leads the sheet to a retraction path 48, reverses the sheet side, and conveys the sheet to the paper discharge port 22.

The gate 30 is a flapper that includes a shaft parallel to a main body depth direction and an acting member that causes a rotating force around the shaft to act on the gate 30 itself. The shaft is an eccentric shaft. The main body depth direction refers to a direction from the front surface 10b to the rear surface 10c.

The acting member refers to a motor or an actuator. A value of a rotation angle of the gate 30 by the acting member is commanded from the selection control section 23.

The main body 10 includes a space on the left side and a space on the right side further on a downstream side in a sheet conveying direction than the gate 30. The gate 30 switches the sheet conveying path to the left or the right according to a command from the selection control section 23. The left side and the right side respectively refer to the left and the right facing the front of the finisher 2.

The gate 30 is stopped by the acting member in positions of two rotation angles.

In one rotation position, the gate 30 blocks the space on the left side and leads the sheet, which is received from the printing section 27, to the second conveying section 28 on the right side. In the other rotation position, the gate 30 blocks the space on the right side and leads the sheet, which is received from the printing section 27, to the third conveying section 29 on the left side.

The reversing section 47 switches the sheet conveying path to any one of the retraction path 48 and the paper discharge port 22 according to a rotation position of a gate 49. The reversing section 47 includes the gate 49, the retraction path 48, a reversal conveying roller 70, and a motor.

The gate 49 is substantially the same as the gate 30. The retraction path 48 is a path branching from the sheet conveying path. The reversing section 47 includes one pair or plural pairs of the reversal conveying rollers 70.

The gate 49 includes two members. In normal usage, the two members are located in positions where the members allow the sheet to directly pass from the right to the left. The two members rotate clockwise and close a sheet path to the left according to a control signal indicating reversal. In the positions of the two members rotated clockwise, the sheet from the right is led to the retraction path 48 by one member.

The first conveying section 26, the second conveying section 28, the third conveying section 29, and the reversing section 47 form one MFP side conveying mechanism (a conveying mechanism).

The MFP 1 is mainly explained above. The finisher 2 is mainly explained below.

The finisher 2 includes a feeding port 51 connected to the paper discharge port 22, a pair of inlet rollers 52 to which a sheet is fed from the feeding port 51, a gate 53 that switches the sheet conveying path, the tray 54 fixed to the main body 50, and the tray 55 enabled to move up and down with respect to the main body 50.

The gate 53 has a configuration substantially the same as the gate 30 on the MFP 1 side. The gate 53 leads the sheet, which is received from the inlet rollers 52, to an upper or lower conveying path.

The finisher 2 includes a finisher side conveying mechanism 56 (a conveying mechanism) and a finisher side controller 57.

The finisher side conveying mechanism 56 controls an acting member of the gate 53 to guide the sheet to the tray 54 or the tray 55.

The finisher side controller 57 controls the gate and the finisher side conveying mechanism 56 and communicates with the main controller 14.

The finisher 2 is notified from the MFP 1 that finishing is not performed. The gate 53 leads the sheet to a pair of end rollers 58. The end rollers 58 discharge the sheet onto the tray 54.

The finisher 2 is notified from the MFP 1 that finishing is performed. The gate 53 leads the sheet to a pair of paper feeding rollers 59.

The finisher 2 includes a waiting tray 60 downstream in the conveying direction of the paper feeding rollers 59, a processing tray 61 below the waiting tray 60, a stapler 62 located below the processing tray 61 and closer to the MFP 1.

The waiting tray 60 aligns a sheet. The waiting tray 60 causes the sheet to fall with the weight of the sheet. When the waiting tray 60 causes the sheet to fall onto the processing tray 61, a paddle 63 aligns a top sheet on the processing tray 61 in a longitudinal direction. The longitudinal direction refers to a sheet moving direction.

The processing tray 61 aligns plural sheets in a lateral direction using a pair of plates 64. The lateral direction refers to a sheet width direction. The processing tray 61 aligns, for example, twenty to thirty sheets and supports the aligned sheets.

The pair of plates 64 are standing plates enabled to slide in the sheet width direction. The pair of plates 64 slide in the sheet width direction. The sheet width direction refers to the main body depth direction.

Alternatively, the processing tray 61 aligns ends of a sheet bundle and waits while the stapler 62 staples the sheet bundle.

The processing tray 61 conveys sorted or stapled sheets to the tray 55 using a belt 65 and rollers 66.

The stapler 62 staples one side of the plural sheets.

The inlet rollers 52, the gate 53, the end rollers 58, a motor, and a sheet guide form an upper conveying section.

The inlet rollers 52, the gate 53, the paper feeding rollers 59, the paddle 63, the belt 65, the rollers 66, an upper motor, and a sheet guide form a lower conveying section. The upper conveying section and the lower conveying section form the finisher side conveying mechanism 56.

The main body 50 of the finisher 2 includes an upper space and a lower space further on the downstream side in the sheet conveying direction than the gate 53. The gate 53 switches the sheet conveying path to an upper or a lower path according to a command from the finisher side conveying mechanism 56.

The finisher side controller 57 controls a switching direction of the gate 53 according to a notification from the main controller 14.

The finisher side controller 57 controls plural motors in the finisher side conveying mechanism 56. The finisher side controller 57 controls rotating directions, rotation amounts, and timings of rotation of the motors.

The finisher 2 includes a transmitter-receiver 67. The MFP 1 includes a transmitter-receiver 68 to be opposed to the transmitter-receiver 67. The transmitter-receivers 67 and 68 transmit and receive a control signal on a signal line 69 by serial communication.

The finisher side controller 57 receives information concerning a printing job from the MFP 1 via the transmitter-receivers 67 and 68.

The information concerning a printing job refers to tray identification information for designating any one of the tray 54 and the tray 55, number-of-sheets information, sheet size information, printing start timing signal, and the like.

The operation of the MFP 1 having the configuration explained above is explained in (a) to (c) below.

Figure 9:
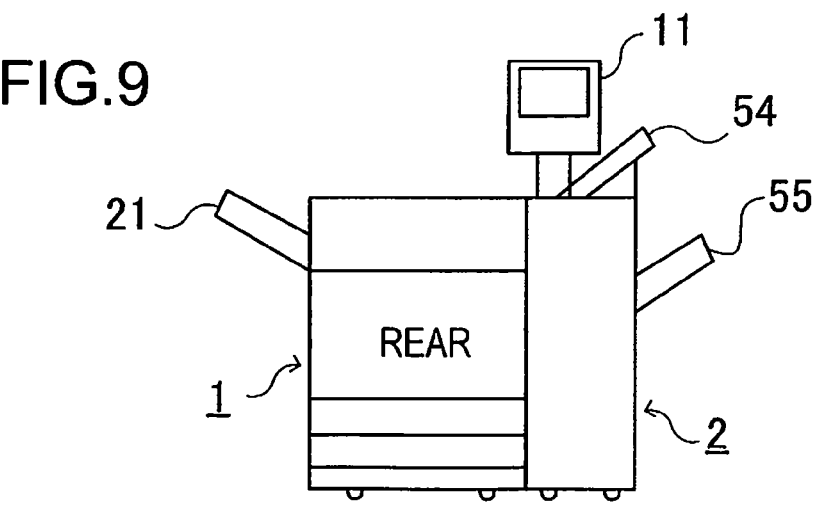
FIG. 9 is a rear view of the image forming apparatus.

(a) The user stands closer to the tray 21 on the rear side of the main body 10. As shown in FIG. 2B, the operation panel 11 is moved closer to the tray 21 on the rear side by the moving mechanism 12 via user operation. The panel surface 15 is rotated by the rotating mechanism 13 via user operation and turns to the rear side (see FIG. 9).

Plural original documents are set in the document feeder 73.

Figure 6:
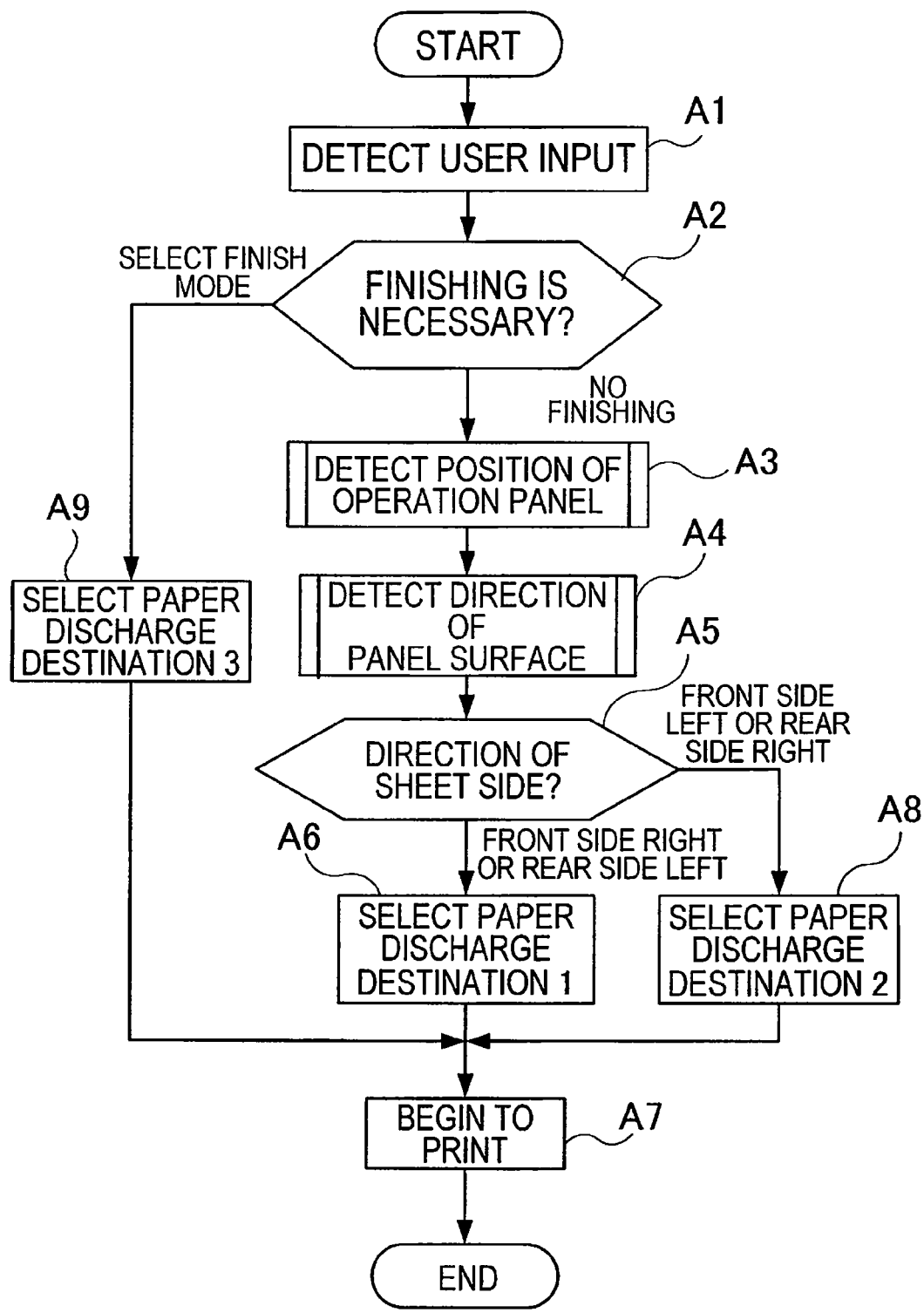
FIG. 6 is a flowchart for explaining an operation for selecting a paper discharge destination by an image forming apparatus according to a second embodiment.

FIG. 6 is a flowchart for explaining an operation for selecting a paper discharge destination by the MFP 1.

In Act A1, the main controller 14 detects that user operation is input to the operation panel 11. The operation panel 11 detects that a copy start button is pressed.

Information incidental to printing is input to the operation panel 11. The information refers to the number of copies and a type of a finish mode by the finisher 2. The information includes an attribute of a sheet and designation of a sheet side of a sheet to be discharged.

The type of the finish mode refers to a sort mode, a group mode, or a staple mode.

The attribute of the sheet refers to a type such as a thick paper, a thin paper, a plain paper, or a film for an overhead projector.

The designation of the sheet side of the sheet to be discharged refers to discharging the sheet with the rear side of the sheet facing up or discharging the sheet with the front side of the sheet facing up.

In Act A2, the main controller 14 determines whether finishing is not performed.

The finish mode is not selected. Through a route referred to as "no finishing", in Act A3, the main controller 14 detects a position of the operation panel 11.

As shown in FIG. 3, the MFP 1 applies a constant voltage to one resistor 113 and the other resistor 114.

The first detecting section 110 detects a value of an electric current from a contact portion of the rail head 106 and the arm 19. Alternatively, the first detecting section 110 detects a value of an electric current from a contact portion of the rail head 107 and the arm 19.

The main controller 14 receives current value information detected from the first detecting section 110. The main controller 14 stores a correspondence table between a current value and position information of the arm 19. Alternatively, the main controller 14 stores a relation expression between the current value and the position information of the arm 19.

The main controller 14 detects a slide position of the operation panel 11 with respect to the main body 10 according to the current value information. The position is, for example, an end of the rear side of the main body 10 closer to the tray 21.

Subsequently, in Act A4 in FIG. 6, the main controller 14 detects a direction of the panel surface 15. The MFP 1 applies a constant voltage to the resistor 115. The second detecting section 111 measures a value of an electric current from the brush 116 that is in contact with the resistor 115.

The main controller 14 stores a correspondence table between the current value and rotation angle information. Alternatively, the main controller 14 stores a relational expression between the current value and the rotation angle information.

The main controller 14 sets, as a reference angle of 0 degree, a position where the panel surface 15 faces the front direction. The main controller 14 stores current value information with respect to the angle 0 degree in advance.

The main controller 14 calculates a rotation angle determined by the current value information stored in advance and current value information obtained by measurement. The main controller 14 detects the direction that the operation panel 11 faces. The direction is, for example, a true rear direction.

Figure 7:
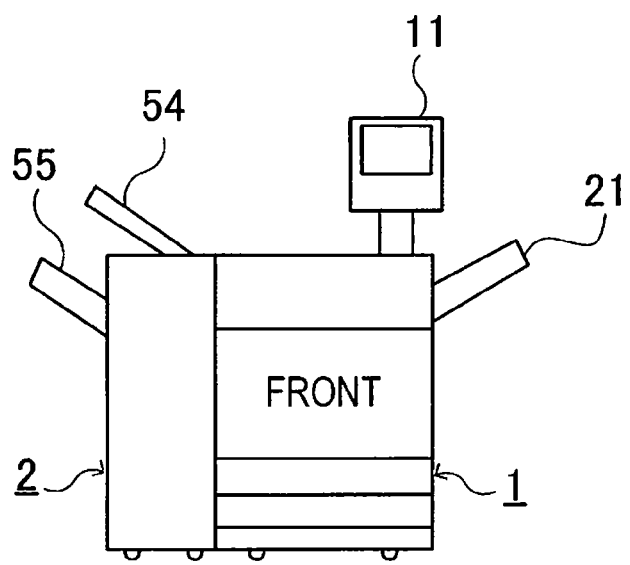
FIG. 7 is a front view of the image forming apparatus.

The main controller 14 determines the paper discharge destination as the tray 21 as shown in FIG. 7 according the position and the direction.

Subsequently, in Act A5, the main controller 14 determines whether the sheet side of the sheet is the front or the rear when the sheet is discharged. The main controller 14 performs the determination on the basis of the sheet side designated in Act A2.

If the main controller 14 determines in Act A5 that the front of the sheet faces up, through a route referred to as front side right, in Act A6, the main controller 14 notifies the gate 30 and the second conveying section 28 of a control signal indicating conveyance to the tray 21.

The gate 30 closes a sheet path to the third conveying section 29. The gate 30 opens the sheet path to the second conveying section 28. The second conveying section 28 starts motor driving.

In Act 7, the MFP 1 starts printing. The MFP 1 reads a document surface with the scanner 35 and generates image data. The MFP 1 forms a latent image on the photoconductive drum 37 and visualizes the latent image with a toner. The MFP 1 transfers a toner image onto one side of the sheet fed from below. The MFP 1 fixes the toner image on the sheet.

The fixing device 42 leads the sheet to the gate 30 with one sheet side, on which the image is placed, facing up and the other sheet side facing down. The gate 30 leads the sheet to the second conveying section 28. The second conveying section 28 discharges the sheet onto the tray 21. On a tray surface, the image on the sheet faces up.

The MFP 1 discharges all of the commanded number of sheets onto the tray 21. Thereafter, the MFP 1 ends the printing job.

(b) Subsequently, the user stands closer to the finisher 2 than the center on the front side of the MFP 1. The operation panel 11 is moved closer to a corner on the rear side close to the finisher 2 from a position closer to the tray 21 on the rear side and moved from the corner to the front side by the moving mechanism 12 according to user operation.

The panel surface 15 facing the rear side according to the user operation turns to the front side as shown in FIG. 2A.

The main controller 14 detects a user input to the operation panel 11 and the start of copying (Act A1 in FIG. 6). The main controller 14 determines necessity of the finishing (Act A2).

If the finishing is unnecessary, the main controller 14 detects the position of the operation panel 11 (Act A3). The slide position is the front side.

Subsequently, the main controller 14 detects the direction of the panel surface 15 (Act A4). The direction is a true front direction.

Figure 8:
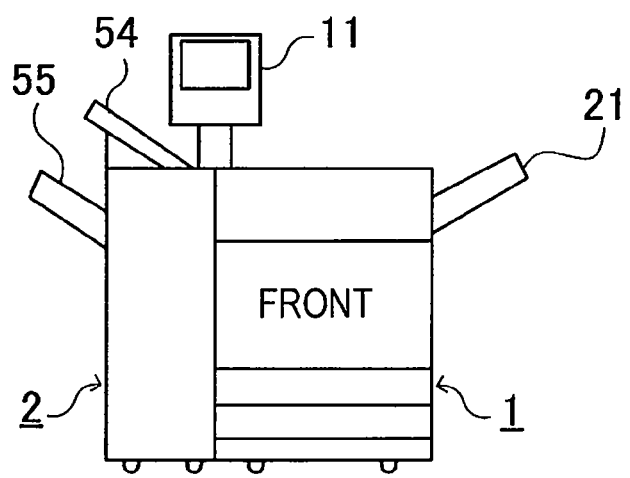
FIG. 8 is another front view of the image forming apparatus.

The main controller 14 determines the paper discharge destination as the tray 54 as shown in FIG. 8.

The main controller 14 determines whether the sheet side of the sheet is the front or the rear when the sheet is discharged (Act A5).

If the main controller 14 determines that the front side of the sheet faces up, through a route referred to as front side left, the main controller 14 selects the second paper discharge destination (Act A8).

In Act A8, the main controller 14 notifies the gate 30, the third conveying section 29, and the reversing section 47 of a control signal indicating conveyance to the finisher 2 side.

The gate 30 closes the sheet path to the second conveying section 28. The gate 30 opens the sheet path to the third conveying section 29. The third conveying section 29 starts motor driving.

The reversing section 47 present in a normal position rotates the gate 49 clockwise to close a sheet path to the finisher 2 side. The gate 49 opens the retraction path 48.

After the start of printing (Act A7), the MFP 1 leads the sheet to the third conveying section 29 using the gate 30. The third conveying section 29 leads the sheet to the gate 49. The gate 49 leads the sheet to the retraction path 48.

The reversing section 47 stops the sheet in the retraction path 48. The reversing section 47 switches back and conveys the sheet with a trailing end of the sheet, which is at a tail end when the sheet arrives, set at a front end. The reversing section 47 reverses the sheet via the gate 49.

The third conveying section 29 conveys the sheet reversed in that way to the paper discharge port 22. The finisher side controller 57 receives a notification from the main controller 14.

The finisher side controller 57 causes the gate 53 to close a lower conveyance space. The end rollers 58 discharge the sheet onto the tray 54 with the image thereon facing up.

Thereafter, the reversing section 47 rotates the gate 49 present in a rotating position counterclockwise. The gate 49 returns to the original position. When the number of copies is designated, the MFP 1 discharges all sheets onto the tray 54.

An example in which the user stands on the finisher side in the rear of the MFP 1 and takes a copy is substantially the same as the example explained above.

(c) Processing performed when the user stands on any one of the front side and the rear side of the MFP 1 and selects finishing is explained below.

The main controller 14 detects a user input to the operation panel 11, which faces any one of the positions and any one of the directions, and the start of copying (Act A1 in FIG. 6).

The main controller 14 determines necessity of finishing (Act A2). If the main controller 14 detects that the finish mode is selected, through a route referred to as finish mode selection, the main controller 14 selects the tray 55 in the finisher 2 (Act A9).

The main controller 14 does not detect the position and the direction of the operation panel 11. The main controller 14 does not determine the sheet side of the sheet when the sheet is discharged.

After the start of the printing (Act A7), the MFP 1 leads the sheet to the third conveying section 29 using the gate 30. The third conveying section 29 causes the sheet to pass through the gate 49 and conveys the sheet to the paper discharge port 22.

The finisher side controller 57 rotates the gate 53 to close an upper conveyance space. The finisher side conveying mechanism 56 leads the sheet to the waiting tray 60.

In the sort mode, the pair of plates 64 determine a placing position of two sets of sheet bundles.

The pair of plates 64 move closer to the front side. The processing tray 61 discharges two sheets from the plates 64 onto the tray 55 every time printing is performed once.

Subsequently, the pair of plates 64 move closer to the rear side. The processing tray 61 discharges two sheets from the plates 64 onto the tray 55 every time printing is performed once. Two sets of sheet bundles are obtained.

In the group mode, it is assumed that the MFP 1 is commanded by the user to group, for example, ten original documents into two groups of sheet bundles.

The pair of plates 64 move closer to the front side. The processing tray 61 discharges ten sheets from the plates 64 onto the tray 55 every time printing is performed once.

Subsequently, the pair of plates 64 move closer to the rear side. The processing tray 61 discharges ten sheets from the plates 64 onto the tray 55 every time printing is performed once. Two groups of sheet bundles are obtained.

In the sort mode or the group mode, the finisher 2 may staple sheets with the stapler 62.

By adopting such a configuration, with the MFP 1, the user can operate the operation panel 11 and discharge a sheet to a position near the user during printing work.

With the MFP 1, it is possible to eliminate useless movement of the user that occurs because the operation panel 11 and the paper discharge destination are apart from each other. It is possible to improve operability for the user.

In the related art, the operation panel is fixed. In the image forming apparatus according to the related art, when a sheet starts to be discharged to the finisher side, the user present on the tray 21 side feels inconvenience.

Even if the user attempts to check the quality of printing, in some case, the tray is distant from the user depending on a position of the user. The user needs to walk a few steps. There is inconvenience that the user cannot check a printing result unless the user moves.

In the MFP 1, the operation panel 11 moves to the front, rear, left, and right. The MFP 1 can receive the number of copies, detection of a printing command, selection of a paper discharge destination, and the like according to a position where the user stands.

With the MFP 1, the user can perform an operation input irrespective of whether the user stands on the front side or the rear side of the main body 10. The user can efficiently use the plural discharge destinations on the left and right.

Third Embodiment

In the second embodiment, the standing position of the user is detected according to the position of the operation panel 11. However, a detecting section that directly detects the standing position of the user may be used.

An image forming apparatus according to a third embodiment is also the MFP 1.

Figure 10:
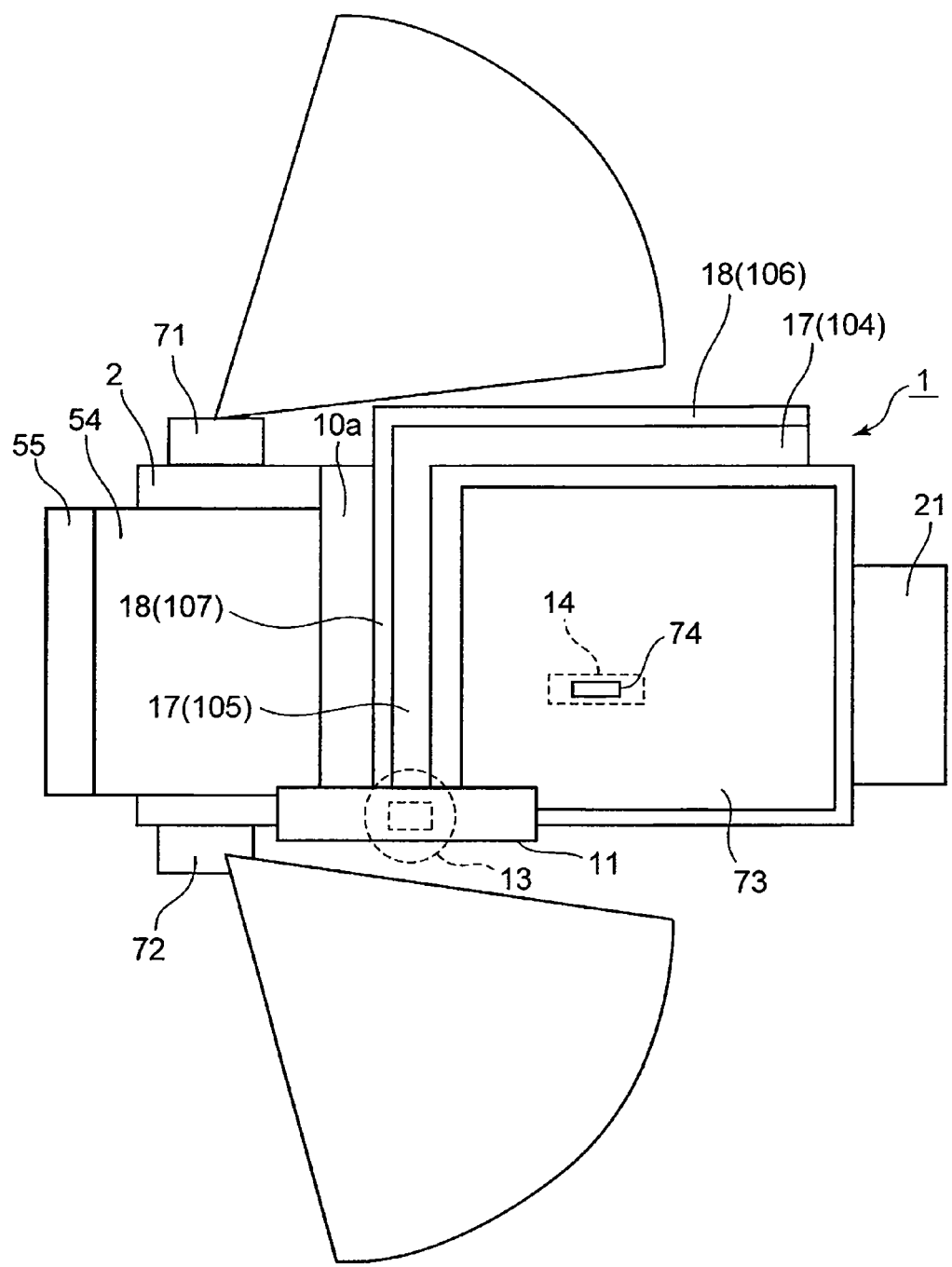
FIG. 10 is a top view of an image forming apparatus according to a third embodiment.

FIG. 10 is a top view of the image forming apparatus according to the third embodiment. The reference numerals and signs already described above denote the same components.

The MFP 1 includes optical sensors 71 and 72 (a third detecting section) respectively on the front side and the rear side.

The optical sensor 71 is, for example, a laser range finder. The optical sensor 71 includes a laser beam source, a mirror that rotates in a horizontal plane, and a photo-receiver that receives a laser beam reflected by the user.

The optical sensor 71 scans a space in an angle range determined according to a rotation angle of the mirror. The optical sensor 71 measures a distance between the sensor and the user according to a light reception output.

The optical sensor 72 is the same as the optical sensor 71.

Outputs of the optical sensors 71 and 72 are input to the main controller 14. The main controller 14 functions as a determining section 74. The main controller 14 determines to which of the front surface side and the rear surface side of the main body 10 a position of the user is closer.

The MFP 1 may include a function of detecting a position of the operation panel 11 and a direction that the panel surface 15 faces.

Otherwise, the MFP 1 has substantially the same configuration as the example shown in FIG. 1 unless specifically noted.

A method of discharging a sheet in the image forming apparatus according to this embodiment is a method of discharging a sheet to any one tray selected out of the trays 21, 54, and 55.

The MFP 1 detects, with the optical sensors 71 and 72, the position of the user who gives an operation input to the panel surface 15 of the operation panel 11 movable with respect to the main body 10 including the paper discharge ports 20 and 22.

The MFP 1 selects any one of the paper discharge ports 20 and 22 present in a place closest to the position.

The MFP 1 forms an image on a sheet according to a printing command to the main body 10. The MFP 1 discharges the sheet onto the tray 21, 54, or 55 connected to the paper discharge port 20 or 22 via the sheet conveying path.

A panel position of the operation panel 11 and a direction angle of the panel surface 15 are detected. The position of the user is detected according to the panel position and the direction angle.

The position of the user is detected by the optical sensors 71 and 72 based on to which of the front surface 10b side and the rear surface 10c side a standing position is closer.

The paper discharge port 20 or 22 is selected by selecting any one of the trays 21, 54, and 55. Further, the paper discharge port 20 or 22 is selected by selecting any one of the trays 21, 54, and 55 close to the finisher 2 side.

The MFP 1 having such a configuration causes the optical sensors 71 and 72 to operate, for example, at timing when an input from the panel surface 15 is detected.

The optical sensor 71 turns the mirror at each angle step determined in advance and writes light reception intensity in the RAM. The light reception intensity or distance information is stored in the memory for each angle. The optical sensor 72 also writes information in the RAM.

The optical sensors 71 and 72 collect information without a dead angle. The main controller 14 searches through the RAM and calculates an angle position where the light reception intensity is the highest. The MFP 1 detects a position where the user stands.

The optical sensors 71 and 72 detect that the light reception intensity is the highest on the finisher 2 side in the front. The main controller 14 detects that the standing position of the user is the finisher 2 side in the front. The MFP 1 selects the tray 54 closer to the finisher 2 in the front.

Thereafter, the method is substantially the same as the example in the second embodiment. If the finish mode is selected, the MFP 1 outputs the sheet to the tray 55 irrespective of a detection result of a position.

The main controller 14 performs detection concerning whether the user stands closer to the tray 21 on the front side, closer to the finisher 2 on the rear side, or closer to the tray 21 on the rear side substantially in the same manner as the example of the determination concerning whether the user stands closer to the finisher 2 on the front side. In this way, the MFP 1 can estimate the position of the user and change the paper discharge destination.

Others

In the embodiments explained above, the second paper discharge destination is the tray 54 provided in the finisher 2. However, a sheet discharge tray functioning as the second paper discharge destination may be provided on the main body 10 of the MFP 1.

The rotation angle by the rotating mechanism 13 may take an angle value different from 360 degrees and 180 degrees. The rotating mechanism 13 only has to rotate the operation panel 11 over an arbitrary angle range including an angle at which the panel surface 15 faces the front direction and an angle at which the panel surface 15 faces the rear direction.

The rotation angle by the rotating mechanism 13 may change to all the angles from 0 degree to 360 degrees. Alternatively, the rotating mechanism 13 may change the rotation angle for each angle step having a determined angle value.

If the rotation angle is within a range of 180 degrees and if the rotation angle is within an arbitrary angle range, the rotating mechanism 13 may also change the rotation angle for each angle step.

The rotating mechanism 13 tilts the panel surface 15 with a tilt mechanism or the like and supports the operation panel 11. This is because an angle of view of the panel surface 15 for the user is different according to the height of an eye line of the user.

The user manually changes a tilt angle and adjusts the angle of view, whereby the operation panel 11 can give luminance required by the user to the user. The operation panel 11 may keep the normal direction of the panel surface 15 in the horizontal direction.

The MFP 1 may use the base frame 17 having a different shape and a different position. The rotating mechanism is provided at the distal end of the arm section. However, the rotating mechanism 13 may be provided at a base of the arm section.

FIGS. 2A, 2B, and 3 to 5 are examples of the structure and the shape of the image forming apparatus according to the embodiments. The structure and the shape can be variously modified. Superiority of the image forming apparatus and the method according to the embodiments to products obtained by simply changing and carrying out the structure and the shape is not spoiled at all.

In the embodiments, the MFP side conveying mechanism 24 conveys the sheet, which is received from the printing section 27, to the tray 21 and the like. However, the MFP 1 may directly output the sheet to the tray 21 and the like without conveying the sheet with a conveying mechanism.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image forming apparatus comprising:
    a main body including a front surface and a rear surface;
    a printing section provided in the main body and configured to form an image on a sheet according to image data;
    an operation panel including a panel surface configured to receive an operation input to the printing section;
    a moving mechanism configured to allow the operation panel to move linearly with respect to the main body; and
    a rotating mechanism configured to allow the operation panel to rotate with respect to the main body about a vertical axis over an angle range including a first angle at which the panel surface faces a front direction and a second angle at which the panel surface faces a rear direction.

2. The apparatus of claim 1, wherein the moving mechanism is configured to allow the operation panel to reciprocatingly slide in the front direction and the rear direction.

3. The apparatus of claim 2, wherein the moving mechanism is configured to allow the operation panel to reciprocatingly slide in a left direction and a right direction with respect to the front surface.

4. The apparatus of claim 1, wherein the moving mechanism is configured to allow the operation panel to reciprocatingly slide in a left direction and a right direction with respect to the front surface.

5. The apparatus of claim 1, wherein the rotating mechanism is configured to allow the operation panel to rotate about the vertical axis through an angle equal to or larger than 180 degrees.

6. An image forming apparatus comprising:
a main body having plural paper discharge ports including a first paper discharge port on a first side surface of the main body and a second paper discharge port on a second side surface of the main body opposite the first side surface, and a first tray connected to the first paper discharge port;
a printing section provided in the main body and configured to form an image on a sheet;
a conveying mechanism configured to discharge the sheet to the first paper discharge port or the second paper discharge port;
a finisher configured receive the sheet from the main body via a feeding port in communication with the second paper discharge port and to execute a finishing process on the sheet;
a second tray provided in the finisher;
an operation panel including a panel surface configured to receive an input of a printing command; and
a controller configured to select the second tray as a discharge destination of the sheet according to a selection of the finishing process in the printing command and to cause the conveying mechanism to discharge the sheet to the second discharge port.

7. The apparatus of claim 6, further comprising:
a moving mechanism configured to allow the operation panel to move linearly with respect to the main body;
a rotating mechanism configured to allow the operation panel to rotate with respect to the main body about a vertical axis over an angle range including a first angle at which the panel surface faces a front direction and a second angle at which the panel surface faces a rear direction;
a first detecting section configured to detect a direction angle in which the panel surface faces; and
a second detecting section configured to detect a panel position, with respect to the main body, of the operation panel moved with the moving mechanism, wherein
the controller determines a user position with respect to the main body according to the detected direction angle and the detected panel position and causes the conveying mechanism to discharge the sheet from the discharge port that is closest to the determined user position.

8. The apparatus of claim 7, wherein the moving mechanism is configured to allow the operation panel to reciprocatingly slide in the front direction and the rear direction and in a left direction and a right direction with respect to a front surface.

9. The apparatus of claim 7, wherein the rotating mechanism is configured to allow the operation panel to rotate about the vertical axis through an angle equal to or larger than 180 degrees.

10. The apparatus of claim 7, further comprising:
plural sheet conveying paths respectively defined between the plural paper discharge ports and the printing section; and
plural gates disposed in the plural sheet conveying paths and configured to respectively switch a paper discharge destination to which the sheet is conveyed to any one of the plural paper discharge ports, wherein
the controller selectively switches at least one of the plural gates and causes the conveying mechanism to convey the sheet to the paper discharge port closest to the determined user position.

11. The apparatus of claim 6, further comprising:
a detecting section configured to directly detect a user position; and
a determining section configured to determine to which of a front surface side and a rear surface side of the main body is closer to the user position, wherein
the controller causes the conveying mechanism to discharge the sheet from the discharge port that is closest to the detected user position.

12. The apparatus of claim 11, further comprising:
plural gates disposed in the plural sheet conveying paths and configured to respectively switch a paper discharge destination to which the sheet is conveyed to any one of the plural paper discharge ports, wherein
the controller selectively switches at least one of the plural gates and causes the conveying mechanism to convey the sheet to the paper discharge port closest to the determined user position.

13. The apparatus of claim 6, further comprising plural other trays respectively connected to each of the plural paper discharge ports, wherein
the controller selects one of the trays and causes the printing section to discharge the sheet to the selected tray.

14. The apparatus of claim 6, wherein the controller causes the operation panel to display information concerning the selected paper discharge port.

15. A method of discharging a sheet in an image forming apparatus, comprising:
detecting a user position of a user who provides an operation input to a panel surface of an operation panel movable with respect to a main body having plural paper discharge ports including a first paper discharge port on a first side surface of the main body and a second paper discharge port on a second side surface of the main body opposite the first side surface, and a first tray connected to the first paper discharge port;
selecting a second tray provided in a finisher configured to receive the sheet from the main body via a feeding port in communication with the second paper discharge port and to execute a finishing process on the sheet according to a selection of the finishing process in the operation input; and
forming an image on the sheet according to image data and discharging the sheet to the second discharge port.

16. The method of claim 15, wherein detecting the user position includes:
detecting a panel position of the operation panel with respect to the main body and a direction angle of the panel surface; and
determining the user position with respect to the main body according to the panel position and the direction angle.

17. The method of claim 16, wherein detecting the user position includes detecting which of a front surface side and a rear surface side of the main body the user position is closer to.

18. The method of claim 15, wherein selecting the second tray includes selecting any one of plural other trays respectively provided on both left and right sides with respect to a front surface.

19. The method of claim 15, wherein selecting the second tray includes selecting, among plural other trays respectively provided on both left and right sides with respect to a front surface, the tray closer to a side of the finisher.

* * * * *